(12) United States Patent
Chen

(10) Patent No.: US 7,679,681 B2
(45) Date of Patent: Mar. 16, 2010

(54) TELEVISION RECEIVER DISPLAYING CALL CENTER INFORMATION BASED ON PRESETTING CHANNELS

(75) Inventor: YungChuan Chen, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1002 days.

(21) Appl. No.: 11/405,419

(22) Filed: Apr. 18, 2006

(65) Prior Publication Data

US 2008/0120660 A1 May 22, 2008

(30) Foreign Application Priority Data

Apr. 19, 2005 (JP) .............................. 2005-121652

(51) Int. Cl.
*H04N 5/44* (2006.01)
*H04N 5/445* (2006.01)
(52) U.S. Cl. ........................ 348/553; 348/725; 348/552; 348/563; 348/14.04; 725/99; 725/133
(58) Field of Classification Search ................. 348/553, 348/552, 563, 567, 725, 729, 731, 14.04; 725/99, 133, 40; 455/414.1, 426.1
See application file for complete search history.

(56) References Cited

U.S. PATENT DOCUMENTS 7,203,158 B2 * 4/2007 Oshima et al. .............. 370/208
7,565,680 B1 * 7/2009 Asmussen ................... 725/135

FOREIGN PATENT DOCUMENTS

JP 7-240884 A 9/1995

* cited by examiner

*Primary Examiner*—M. Lee
*Assistant Examiner*—Jean W Désir
(74) *Attorney, Agent, or Firm*—Crowell & Moring LLP

(57) ABSTRACT

Disclosed is a television receiver including a presetting section to carry out presetting by assigning a frequency in a receiving band to each of a plurality of receiving channel positions as a preset channel including: a memory section to store telephone number information of a call center which responds to an inquiry of a customer; a display section to display the telephone number information of the call center; a judging section to judge whether or not at least one of the receiving channel positions has been preset by the presetting section; and a display controlling section to read the telephone number information of the call center stored in the memory section and to display the read telephone number information in the display section, when the judging section has judged that no presetting has been carried out in any one of the receiving channel positions by the presetting section.

3 Claims, 2 Drawing Sheets

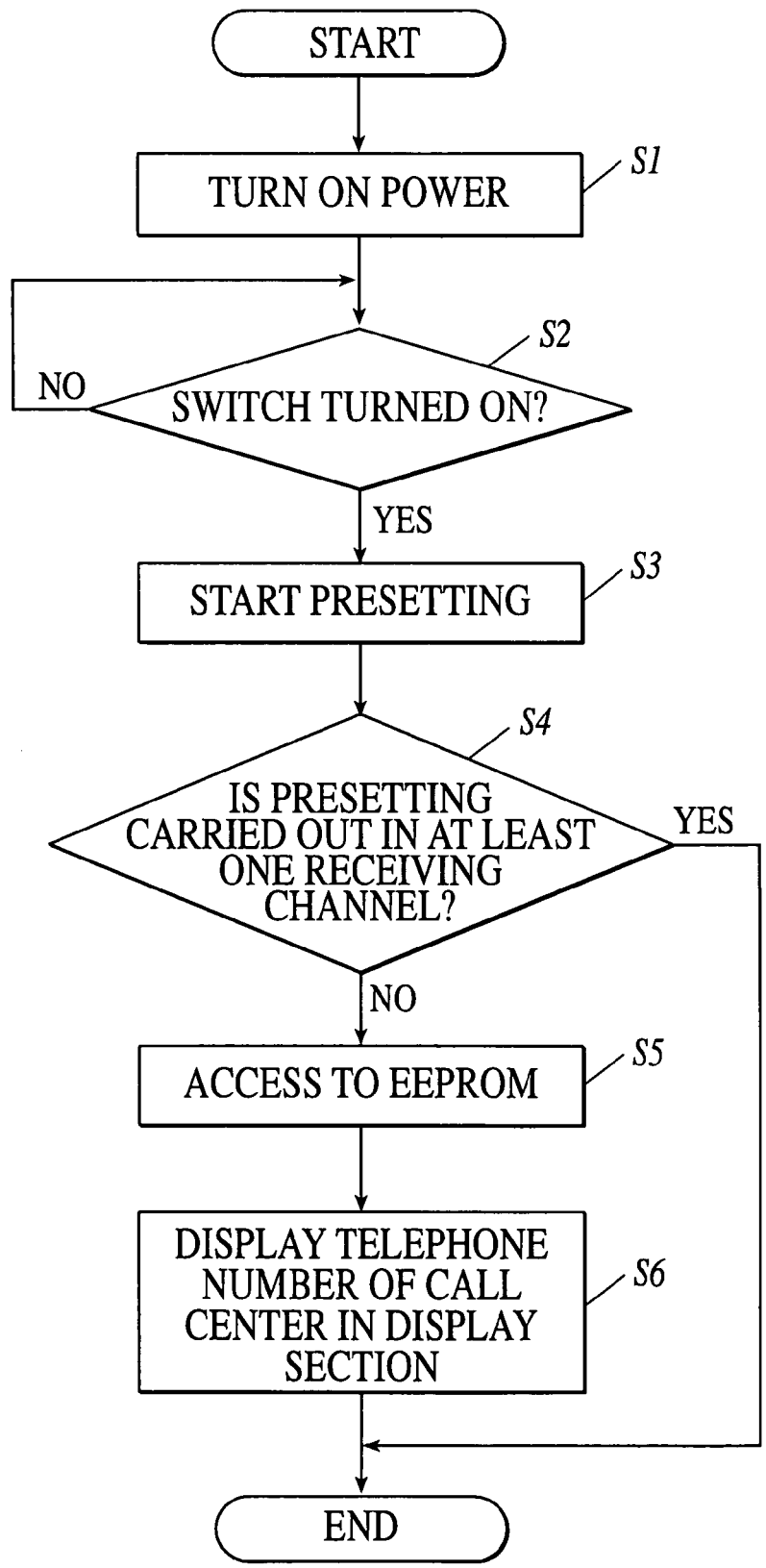

TELEVISION RECEIVER DISPLAYING CALL CENTER INFORMATION BASED ON PRESETTING CHANNELS

BACKGROUND OF THE INVENTION

1. Field of the Invention

The present invention relates to a television receiver.

2. Description of Related Art

When a television is purchased, the television is packaged in a packing case along with an instruction manual thereof. A user who purchased the television starts the television by connecting a plug of the television to a power source. When the television is first started after the purchase thereof, presetting has not been carried out. Herein, the presetting means that frequencies in receiving bands are allotted as preset channels for each of a plurality of receiving channel positions. Some types of presetting are carried out by a user, and other types of presetting are automatically carried out when the television is powered on.

Information regarding such presetting and treatment methods for television trouble are described in the instruction manual packaged together with the television. In addition, the telephone number of a call center of the manufacturers is described in the instruction manual. When a trouble for unknown reasons occurs, or when a user has a question regarding a point not described therein, it is possible for the user to make an inquiry to the call center.

However, since a significant amount of information is described in the instruction manual, it is cumbersome to acquire the type of information which a user wants. Therefore, such a television has been proposed, which, in order for a user to save trouble in looking at the instruction manual, is provided with a trouble diagnosing unit by which trouble diagnosis is automatically carried out, and when it is judged that a trouble spot has been brought about, a list of trouble spots and the telephone number of the call center are displayed on the screen thereof (for example, see JP HEI-7-240884A).

However, in the television described in JP HEI-7-240884A, the contents of the instruction manual are displayed in a state where the television is already used. That is, it is a premise that the presetting upon purchasing the television has been carried out.

Therefore, if a user has an unclear point about presetting, it is not possible to know the treatment nor is it possible to make a call to the call center unless the user checks with the instruction manual. In addition, although the telephone number of the call center is indicated by adhering a seal to the cabinet of the television or inscribing the cabinet of the television, such information is indicated on the back or the side thereof so that it is not easily visible. Therefore, it is difficult to find the information after the television is installed by a wall. Furthermore, there may be a case where a user is convinced that no picture displayed on the screen based on some presetting not being carried out is a trouble, and returns the television not having any problem and trouble without checking the instruction manual in which it is cumbersome to retrieve information.

SUMMARY OF THE INVENTION

The present invention was developed to solve the above-described problems, and it is one of the objects of the present invention to provide a television receiver which can reduce a trouble of a user when presetting is not correctly carried out so as to prevent the television from returning.

To solve the above-described problems, according to a first aspect of the present invention, a television receiver comprising a presetting section to automatically carry out presetting by assigning a frequency in a receiving band to each of a plurality of receiving channel positions as a preset channel; a memory section to store telephone number information of a call center which responds to an inquiry of a customer, and the telephone number information of the call center being rewritable; a display section to display the telephone number information of the call center; a judging section to judge whether or not at least one of the receiving channel positions has been preset by the presetting section; and a display controlling section to read the telephone number information of the call center stored in the memory section, and to display the read telephone number information in the display section, when the judging section judges that no presetting has been carried out in any one of the receiving channel positions by the presetting section.

Therefore, the presetting section automatically starts presetting by assigning a frequency in the received band to each of a plurality of receiving channel positions as a preset channel. At this time, the judging section judges whether or not at least one of the receiving channel positions is carried out by the presetting section. When the judging section has judged that presetting was not carried out in any one of the receiving channels by the presetting section, the display controlling section reads the telephone number information of the call center stored in the memory section and displays the read telephone number information in the display section.

Accordingly, unless presetting is carried out for some receiving channels when presetting is executed, the telephone number of the call center is displayed to urge a user to make a call to the call center. Therefore, since a user knows the method of treatment without checking the instruction manual, the trouble of the user can be reduced when the presetting is not correctly carried out, it is possible to prevent the television from being returned.

In addition, since the memory section is devised so that the telephone number information of the call center can be rewritten, it is sufficient that the memory section is rewritten even if the telephone number is changed due to transfer of the call center or new installation thereof. Therefore, it is possible to quickly cope with the change in the telephone number information even during production, wherein the telephone number of the call center can be further simply changed in comparison with a case where a sticker on which the telephone number of the call center is described is re-adhered or the telephone number is re-inscribed on the cabinet, and it is possible to decrease the costs.

In addition, since the presetting can be automatically carried out, the trouble of a user can be reduced.

According to a second aspect of the present invention, a television receiver comprising a presetting section to carry out presetting by assigning a frequency in a receiving band to each of a plurality of receiving channel positions as a preset channel; a memory section to store telephone number information of a call center which responds to an inquiry of a customer; a display section to display the telephone number information of the call center; a judging section to judge whether or not at least one of the receiving channel positions has been preset by the presetting section; and a display controlling section to read the telephone number information of the call center stored in the memory section and to display the read telephone number information in the display section, when the judging section has judged that no presetting has been carried out in any one of the receiving channel positions by the presetting section.

Therefore, the presetting section starts presetting by assigning a frequency in the receiving band to each of a plurality of receiving channel positions as a preset channel. At this time, the judging section judges whether or not at least one of the receiving channel positions is preset by the presetting section. When the judging section has judged that presetting was not carried out in any one of the receiving channels by the presetting section, the display controlling section reads the telephone number information of the call center stored in the memory section and displays the read telephone number information in the display section.

Accordingly, unless presetting is carried out in any receiving channel when presetting is executed, the telephone number of the call center is displayed to urge a user to make a call to the call center. Therefore, since a user knows the method of treatment without checking the instruction manual, the trouble of the user can be reduced when the presetting is not correctly carried out, it is possible to prevent the television from being returned.

It is preferable that the telephone number information of the call center is rewritable.

Therefore, since the memory section is devised so that the telephone number information of the call center can be rewritten, it is sufficient that the memory section is rewritten even if the telephone number is changed due to transfer of the call center or new installation thereof. Therefore, it is possible to quickly cope with the change in the telephone number information even during production, wherein the telephone number of the call center can be further simply changed in comparison with a case where a sticker on which the telephone number of the call center is described is re-adhered or the telephone number is re-inscribed on the cabinet, and it is possible to decrease the costs.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 2 is a flowchart describing a procedure of presetting the television.

DETAILED DESCRIPTION OF THE INVENTION

Figure 1:
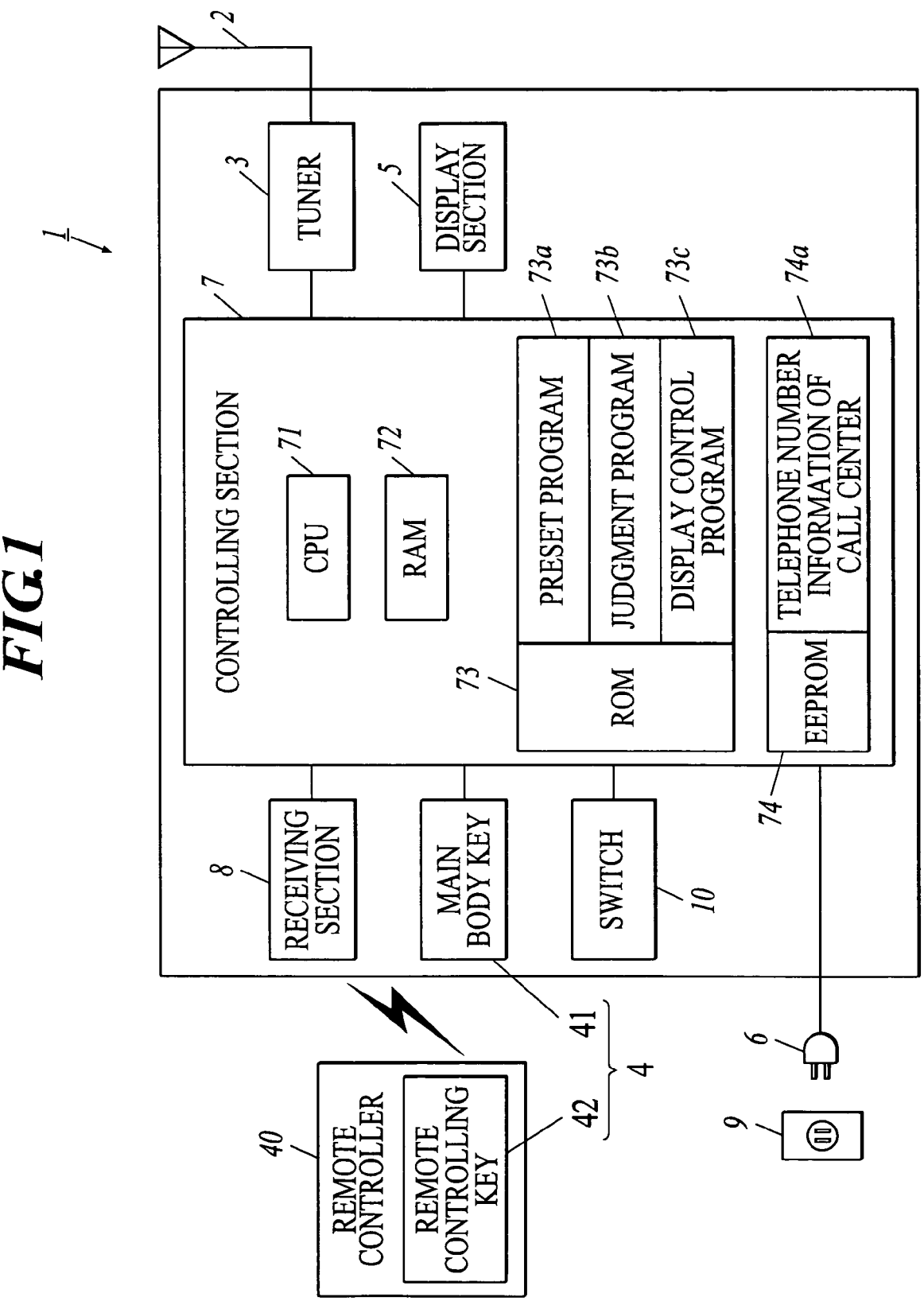
FIG. 1 is a configurational block diagram of a television.

Hereinafter, referring to the drawings, a detailed description is given of a best mode of a television receiver according to the invention.

[Configuration of a Television Receiver]

As depicted in FIG. 1, a television receiver 1 (hereinafter called a TV 1) includes a tuner 3 for receiving television broadcasting signals of a predetermined frequency via a receiving antenna 2, operation keys 4 for inputting operations of the TV 1, a display section 5 for displaying pictures based on the received television broadcasting signals, a plug 6 for acquiring power which drives the TV 1 from a power source 9, a controlling section 7 for driving respective parts with power acquired via the plug 6 and controlling the respective parts, and a switch 10 for turning on and off the TV 1 in a state where the plug 6 is connected to the power source 9.

The tuner 3 receives television broadcasting signals of a frequency to be received, based on control signals (frequency data) from the controlling section 7, wherein presetting can be carried out by changing the frequencies of television broadcasting signals to be received per channel.

The operation keys 4 comprises main body keys 41 secured on the main body of the TV 1 and remote-controlling keys 42 of a remote controller 40 for remotely controlling the TV 1. Almost the same operations can be carried out with either the keys 41 or the keys 42.

The main body keys 41 are connected to the controlling section 7, and operation signals based on operation input from the main body keys 41 are transmitted to the controlling section 7. Operation signals transmitted from the remote controller 40 by operation input of the remote-controlling keys 42 are received by the receiving section 8 of the corresponding operation signals, which is installed in the TV 1, and are transmitted from the receiving section 8 to the controlling section 7. Also, an infrared radiation source may be used for the operation signals from the remote controller 40.

The display section 5 comprises a CRT or liquid crystal. The display section 5 is connected to the controlling section 7, displays pictures based on the television broadcasting signals by control signals from the controlling section 7, and additionally displays the telephone number information of the call center stored in an EEPROM 74 (described later) in the controlling section 7.

The plug 6 is connected to a power source 9 of general household. The TV 1 can be started by inserting the plug 6 into the power source 9.

The controlling section 7 is provided with a CPU 71 for executing various types of calculation processes, a RAM 72 which is used as a work area of the CPU 71, a ROM 73 in which system programs and data necessary for the CPU 71 to control respective parts are stored, and an EEPROM 74, in which the telephone number information of the call center responding to an inquiry of a user is stored, and in which the telephone number information of the call center can be rewritten.

The CPU 71 reads programs stored in the ROM 73 and develops the read programs in the RAM 72, and controls instructions to respective parts, transmission and receiving of data based on the corresponding programs.

A preset program 73a is stored in the ROM 73, which achieves a feature of automatically presetting by assigning a frequency in a receiving band to each of a plurality of receiving channel positions as a preset channel. That is, by the CPU 71 executing the preset program 73a, the controlling section 7 functions as a presetting section.

In addition, a judgment program 73b for achieving a feature of judging whether or not at least one of the receiving channel positions is preset when presetting is carried out by the CPU 71 executing the preset program 73a is stored in the ROM 73. That is, by the CPU 71 executing the judgment program 73b, the controlling section 7 functions as a judging section.

Further, a display control program 73c is stored in the ROM 73. When it is judged by the judging program 73b that presetting is not carried out by execution of the presetting program 73a in any one of the receiving channels, the display control program 73c reads the telephone number information 74a of the call center stored in the EEPROM 74 and displays the read telephone number information in the display section. That is, by the CPU 71 executing the display control program 73c, the controlling section 7 functions as a display controlling section.

The switch 10 is, for example, a switch for turning on and off the main power source secured downward of the display section 5 of the TV 1. By pressing the switch 10 in a state where the plug 6 is connected to the power source 9, the switch 10 is turned on and starts respective parts. By pressing the switch 10 again, the switch 10 is turned off and stops the functions of the respective parts.

[Operations of Television Receiver]

Next, a description is given of operations of the television receiver.

As depicted in FIG. 2, a user takes out a TV 1 from its packaging case, and connects the plug 6 of the TV 1 to the power source 9. Then, power is supplied to the controlling section 7 (Step S1).

Next, the CPU 71 judges whether or not the switch 10 is turned on (Step S2). Here, when the CPU 71 has judged that the switch 10 is turned on (Step S2: Yes), by executing the preset program 73a stored in the ROM 73, the CPU 71 carries out presetting by assigning a frequency in the receiving band to each of a plurality of receiving channel positions as a preset channel (Step S3). On the other hand, when the CPU 71 judges that the switch 10 is not turned on (Step S2: No), the CPU 71 repeats a judgment process of Step S2.

Next, by executing the judgment program 73b stored in the ROM 73, the CPU 71 judges whether or not at least one of the receiving channel positions is preset (Step S4).

Herein, when the CPU 71 judges that at least one of the receiving channel positions has been preset (Step S4: Yes), the CPU 71 terminates the process (END). On the other hand, when the CPU 71 judges that no presetting has been carried out in any one of all receiving channels (Step S4: No), by executing the display control program 73c stored in the ROM 73, the CPU 71 reads the telephone number information 74a of the call center stored in the EEPROM 74 (Step S5), and informs a user of the telephone number information 74a by displaying the read telephone number information in the display section 5 (Step S6). Here, the process ends.

[Operational Advantages of the Embodiment]

With the television receiver according to the embodiment, when the power source of the TV 1 is turned on, the CPU 71 starts presetting by assigning a frequency in the receiving band to each of a plurality of receiving channel positions as a preset channel formed in a memory area of the EEPROM 74 by executing the preset program 73a. At this time, by executing the judgment program 73b, the CPU 71 judges whether or not at least one of the receiving channel positions is preset. When it is judged, by execution of the judgment program 74b, that no presetting has been carried out in any one of the receiving channels by the preset program 74a, the CPU 71 reads the telephone number information 74a of the call center stored in the EEPROM 74, and displays the read telephone number information in the display section 5 by executing the display control program 74c.

Accordingly, unless presetting is carried out in any one of the receiving channels when the presetting is carried out, the telephone number of the call center is displayed to urge a user to make a call to the call center. Therefore, since a user is able to know the method for treatment without checking the instruction manual, the trouble of the user can be reduced when the presetting is not correctly carried out, and it is possible to prevent the TV 1 from being returned.

In addition, since the telephone number information 74a of the call center can be rewritten in the EEPROM 74, it is sufficient that the contents of the EEPROM 74 are rewritten even if the telephone number is changed due to transfer of the call center or new installation thereof, wherein it is possible to quickly cope with the change in the telephone number information even during production. That is, the change can be further simply coped with in comparison with cases where a sticker on which the telephone number of the call center is described is re-adhered, or the telephone number is re-inscribed on the cabinet, wherein it is possible to attempt to reduce the costs.

Further, since the presetting can be automatically carried out by turning on the switch 10, the trouble of a user can be reduced.

Also, the invention is not limited to the embodiment described above. For example, a presumed case of trouble may be displayed in the display section 5 along with displaying the telephone number information 74a of the call center therein. Therefore, a possibility for a trouble to be solved can be increased without making a call to the call center, explanation by an operator in the call center can be carried out on the basis of the contents displayed in the display section 5, wherein a more comprehensible explanation is brought about.

Further, in the above-described embodiment, the presetting is automatically carried out by turning on the switch 10 of the TV 1. The presetting may be manually carried out by operation input using a remote-controlling key 42 of the remote controller 40 or a main body key 41.

Also, in the embodiment described above, the presetting is started at the timing when the switch 10 is turned on. The presetting may be automatically started by predetermined operation input using the remote-controlling key 42 of the remote controller 40 or a main body key 41.

The entire disclosure of Japanese Patent Application No. 2005-121652 filed on Apr. 19, 2005, including description, claims, drawings, and summary are incorporated herein by reference.

What is claimed is:

1. A television receiver comprising:
a presetting section to automatically carry out presetting by assigning a frequency in a receiving band to each of a plurality of receiving channel positions as a preset channel;
a memory section to store telephone number information of a call center which responds to an inquiry of a customer, and the telephone number information of the call center being rewritable;
a display section to display the telephone number information of the call center;
a judging section to judge whether or not at least one of the receiving channel positions has been preset by the presetting section; and
a display controlling section to read the telephone number information of the call center stored in the memory section, and to display the read telephone number information in the display section, when the judging section judges that no presetting has been carried out in any one of the receiving channel positions by the presetting section.

2. A television receiver comprising:
a presetting section to carry out presetting by assigning a frequency in a receiving band to each of a plurality of receiving channel positions as a preset channel;
a memory section to store telephone number information of a call center which responds to an inquiry of a customer;
a display section to display the telephone number information of the call center;
a judging section to judge whether or not at least one of the receiving channel positions has been preset by the presetting section; and
a display controlling section to read the telephone number information of the call center stored in the memory section and to display the read telephone number information in the display section, when the judging section has judged that no presetting has been carried out in any one of the receiving channel positions by the presetting section.

3. The television receiver according to claim 2, wherein the telephone number information of the call center is rewritable.

* * * * *